United States Patent
McGhie

(10) Patent No.: US 6,796,572 B1
(45) Date of Patent: Sep. 28, 2004

(54) METHOD FOR STEERING A TRANSPORT VEHICLE AND APPARATUS THEREFOR

(75) Inventor: James R. McGhie, Las Vegas, NV (US)

(73) Assignee: American Heavy Moving & Rigging Inc., Chino, CA (US)

( * ) Notice: Subject to any disclaimer, the term of this patent is extended or adjusted under 35 U.S.C. 154(b) by 0 days.

(21) Appl. No.: 10/440,721

(22) Filed: May 17, 2003

Related U.S. Application Data

(60) Provisional application No. 60/383,554, filed on May 24, 2002.

(51) Int. Cl.[7] .............................................. B62D 53/00
(52) U.S. Cl. ...................... 280/426; 280/442; 280/444
(58) Field of Search ................................. 280/426, 442, 280/444

(56) References Cited

U.S. PATENT DOCUMENTS

| | | | | |
|---|---|---|---|---|
| 3,561,791 A | * | 2/1971 | Gego | 280/443 |
| 3,753,580 A | * | 8/1973 | Folkert | 280/443 |
| 3,876,240 A | * | 4/1975 | Watson | 280/443 |
| 4,171,825 A | * | 10/1979 | Woodell | 280/443 |
| 4,405,147 A | * | 9/1983 | Horsman et al. | 280/443 |
| 4,451,058 A | * | 5/1984 | Curry | 280/476.1 |
| 4,579,362 A | * | 4/1986 | Kirkpatrick | 280/444 |
| 4,768,802 A | * | 9/1988 | Winkler | 280/426 |
| 5,244,226 A | * | 9/1993 | Bergh | 280/442 |
| 5,700,023 A | * | 12/1997 | Picard | 280/426 |
| 5,860,667 A | * | 1/1999 | Andre | 280/408 |
| 6,158,759 A | * | 12/2000 | Perry | 280/444 |
| 6,170,848 B1 | * | 1/2001 | Wechner | 280/411.1 |

* cited by examiner

*Primary Examiner*—Lesley D. Morris
*Assistant Examiner*—L. Lum
(74) *Attorney, Agent, or Firm*—Timothy Thut Tyson; Ted Masters; Freilich, Hornbaker & Rosen

(57) ABSTRACT

A method and device for steering a heavy load transport vehicle includes a variable length strut which cooperates with a power steering valve. The length of the variable length strut changes as a function of tow bar rotation. This length variation is mechanically coupled to the power steering valve, which in turn controls an automatic steering system. The present invention permits mechanical steering of the transport vehicle even in the event of failure of the automatic steering system, and does so without placing mechanical stress upon the power steering valve.

11 Claims, 11 Drawing Sheets

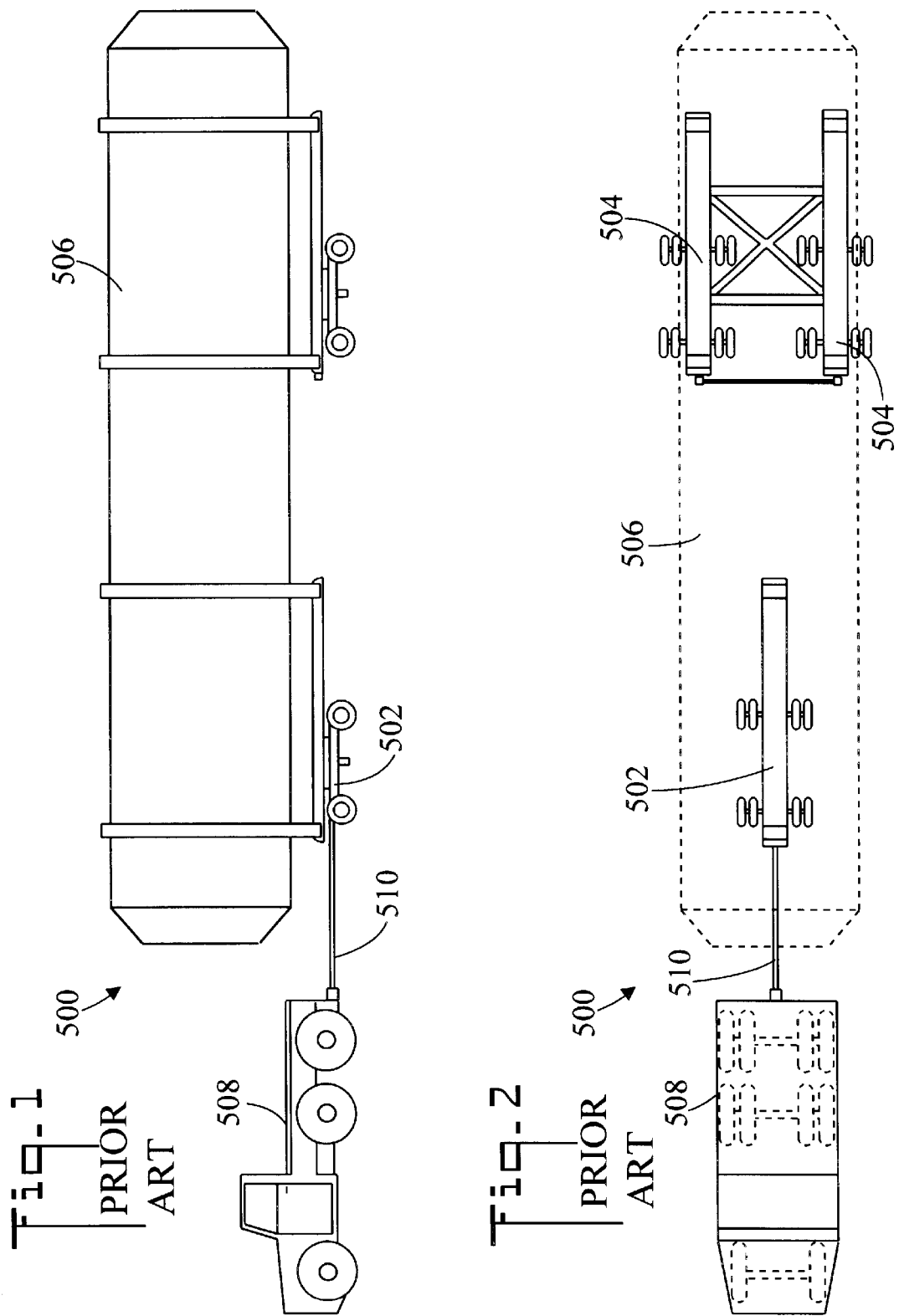

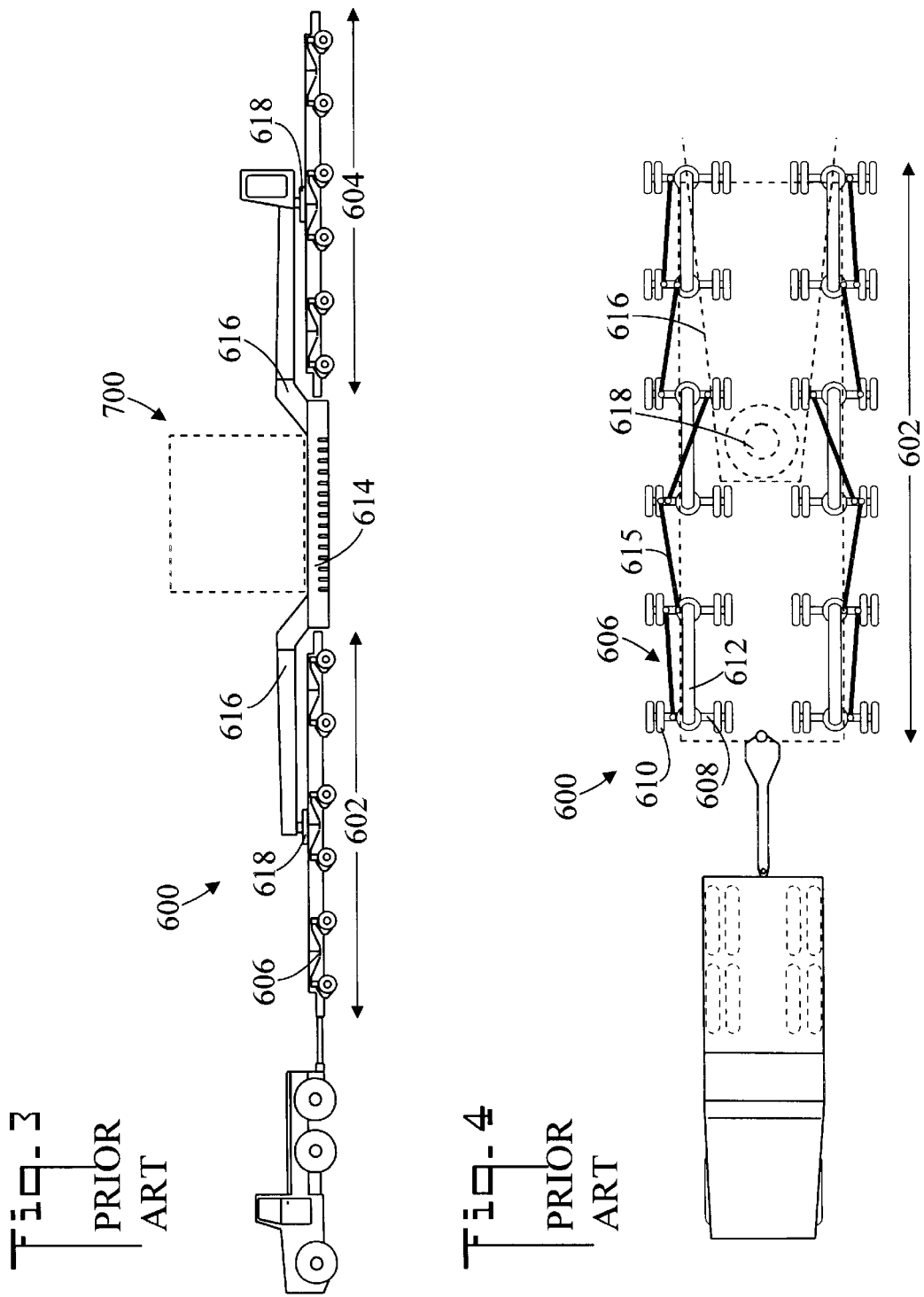

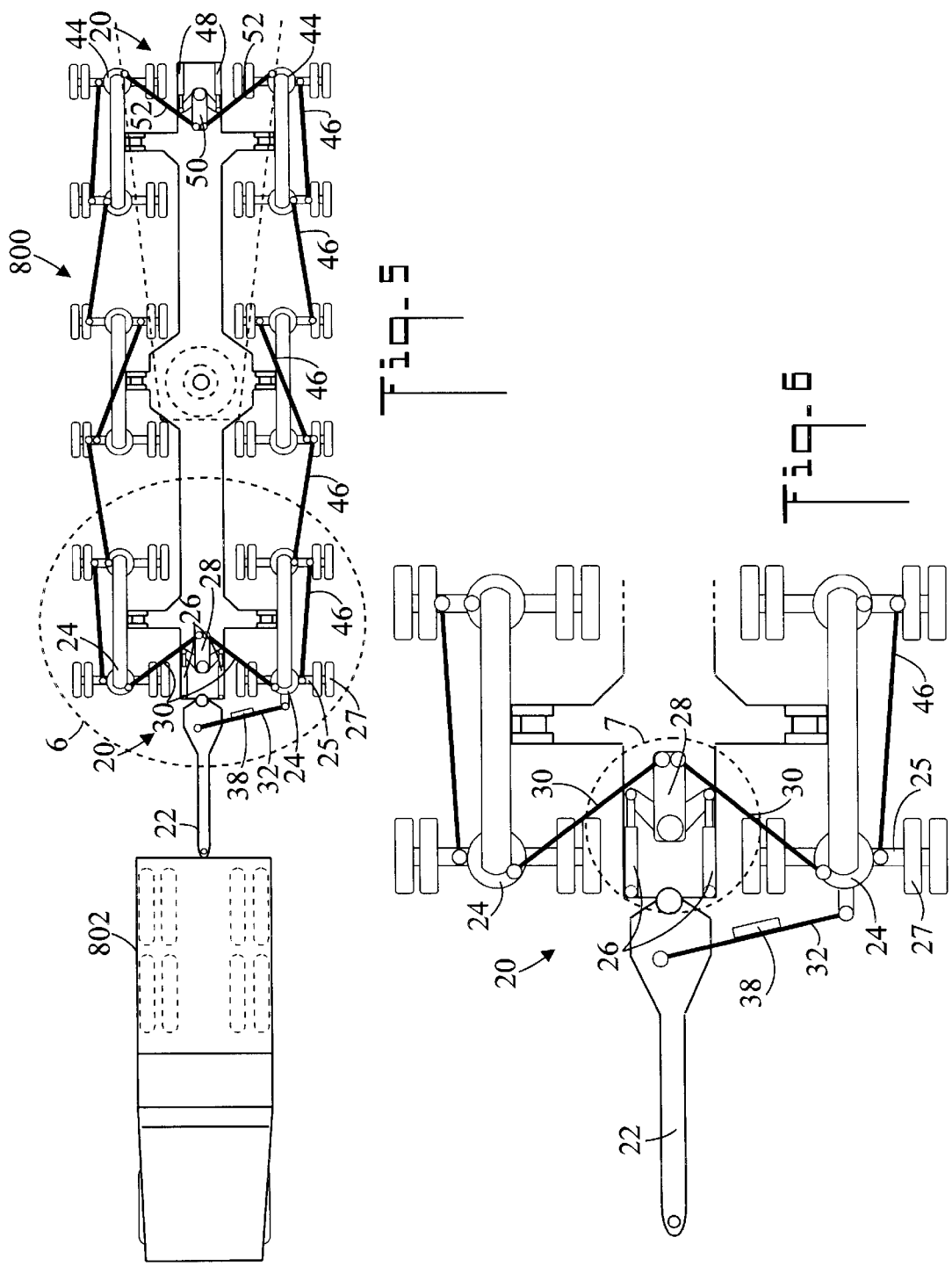

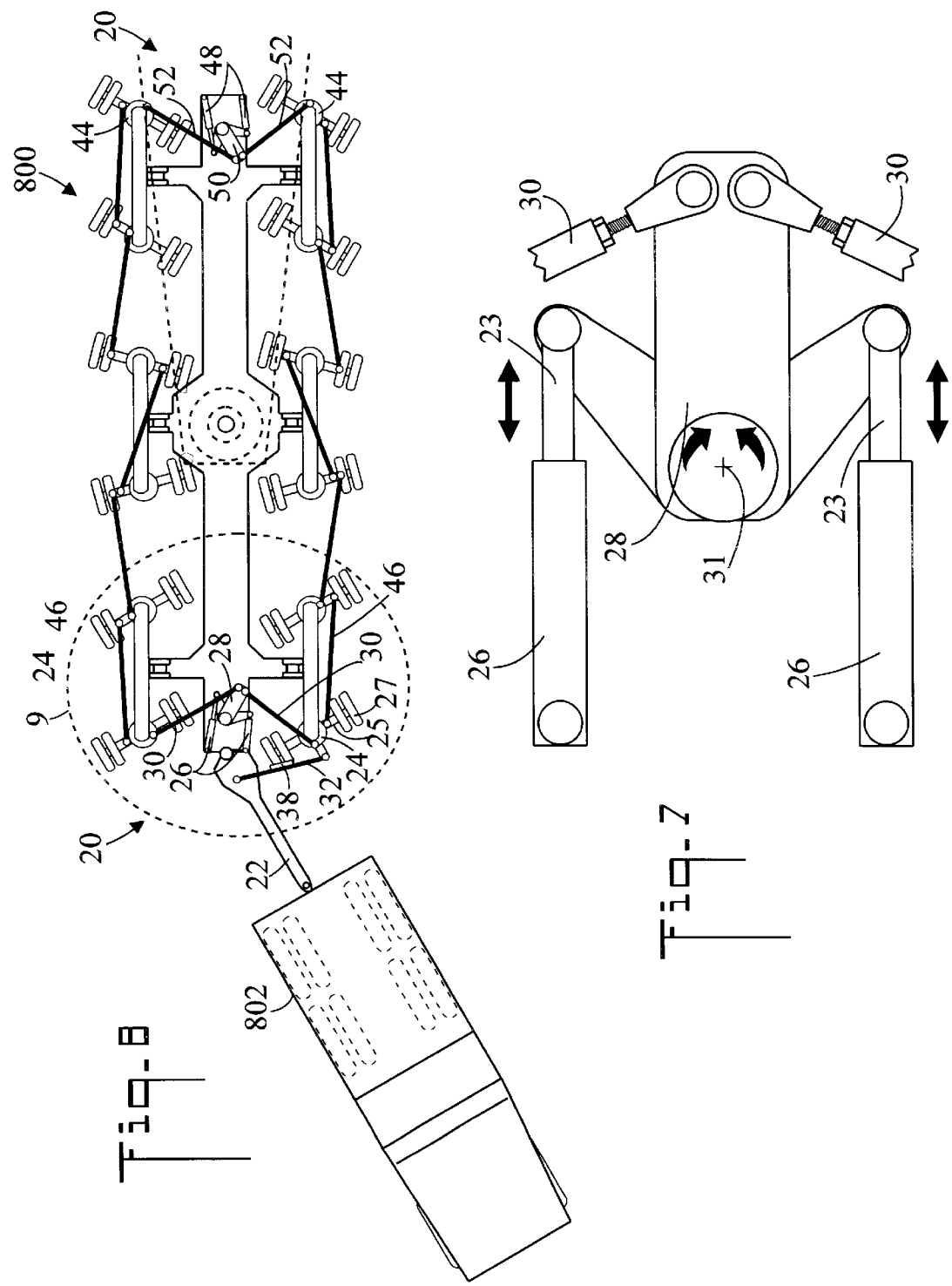

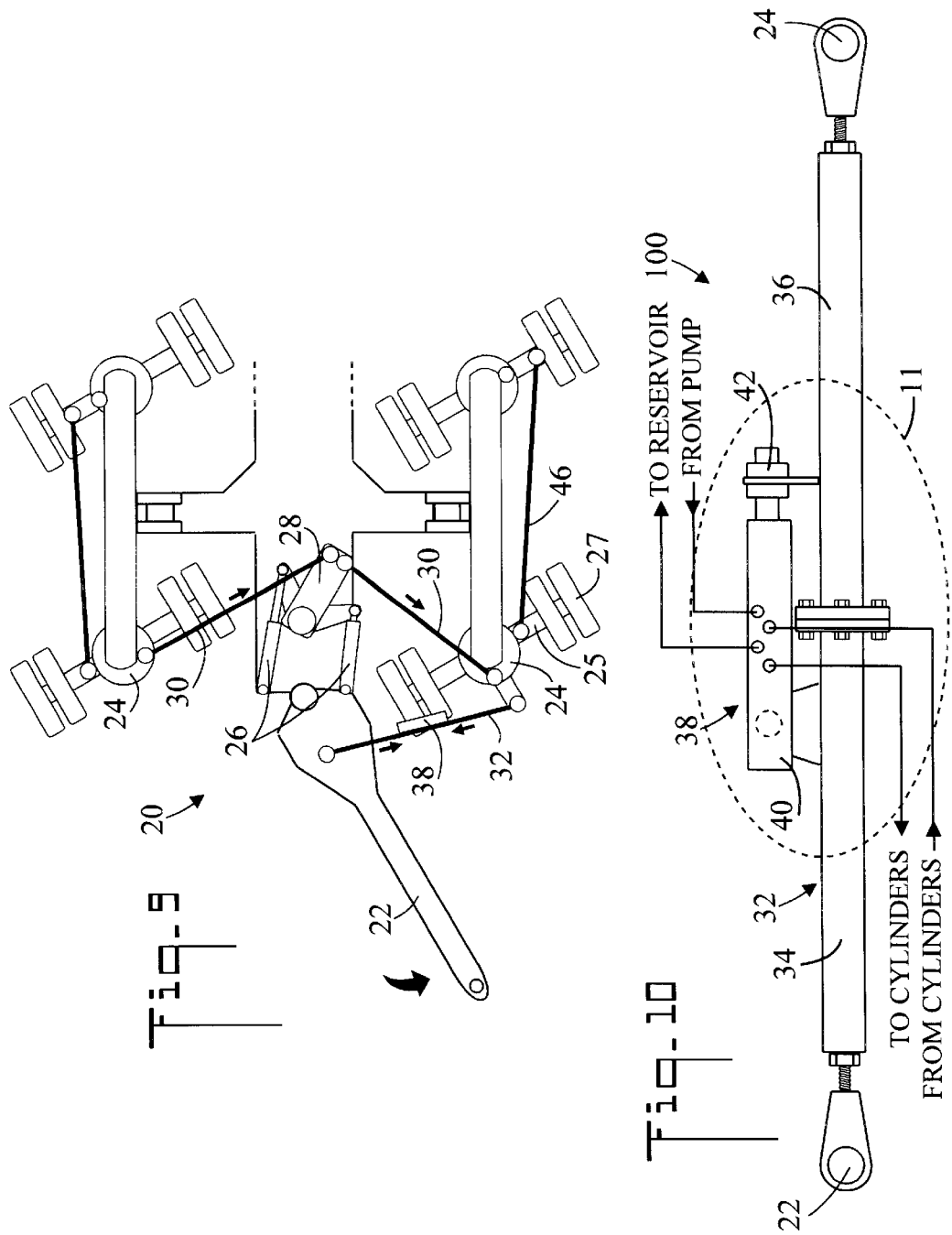

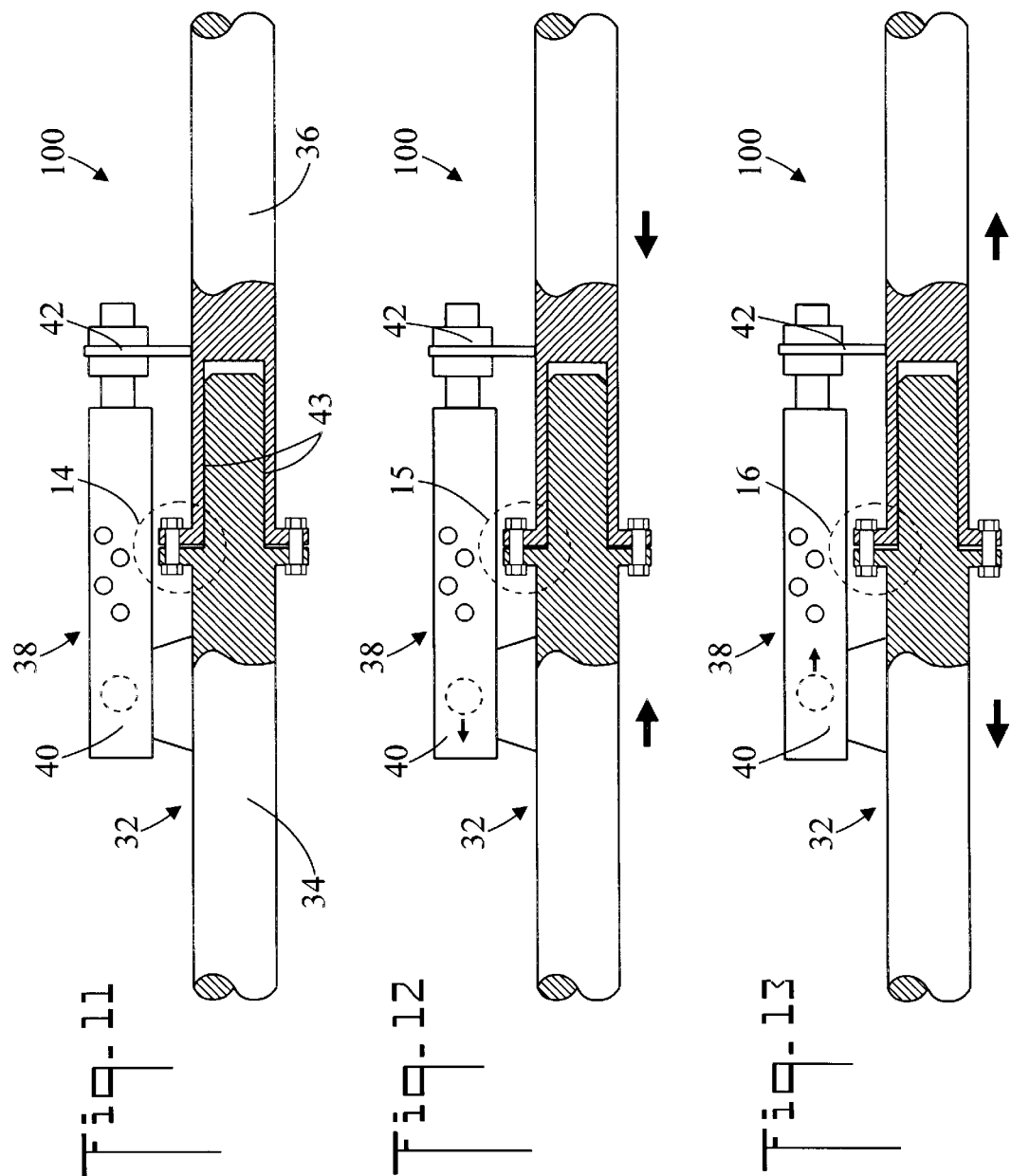

METHOD FOR STEERING A TRANSPORT VEHICLE AND APPARATUS THEREFOR

CROSS REFERENCE TO RELATED APPLICATION

This application claims the filing benefit under 35 U.S.C. § 119(e) of U.S. Provisional Application No. 60/383,554, filed May 24, 2002, which is included herein by reference.

TECHNICAL FIELD

This invention relates generally to multi-axle transport vehicles for moving heavy loads, and more particularly to a method and apparatus for steering the transport vehicle.

BACKGROUND OF THE INVENTION

Heavy hauling vehicles for moving transformers, cranes, boats, industrial equipment, and other heavy objects are well known in the art. An example of such a vehicle is shown in U.S. Pat. No. 4,943,078 which discloses a heavy load hauler for traveling on conventional roadways for moving heavy construction equipment such as cranes or the like from one work site to another. The hauler includes a front tractor drawn carriage, a rear carriage, and a load unit between and carried by the carriages. The front carriage is supported upon a multiplicity of independent wheel and axle units. There is a first fifth wheel coupling at the leading end of the front carriage for connecting to the fifth wheel coupling of a tractor. A second fifth wheel coupling is spaced rearwardly. The load carrying rear carriage is also supported upon a multiplicity of independent wheel and axle units. There is a fifth wheel coupling intermediate the leading and trailing ends of the carriage. The load unit has forwardly and rearwardly projecting goosenecks. Each gooseneck has a fifth wheel coupling. The one on the forwardly projecting gooseneck connects to the fifth wheel coupling on the front carriage. The one on the rearwardly projecting gooseneck connects to the fifth wheel coupling on the rear carriage. The load unit may be either the crane itself or a flatbed upon which the crane is carried. At least some of the independent wheel and axle units are steerably mounted on their carriages. Each wheel and axle unit has its wheels supported by a hydraulic suspension. Hydraulic circuitry interconnects all of the suspensions so as to equally distribute the load among all of the wheel units. Steering of the independent wheel and axle units is interphased for the front and rear carriages by a pair of operatively associated interrelated inline valve cylinder units. FIG. 12A shows a valve 718 used in a power steering system which is coupled to a connecting link 703.

Other heavy hauling vehicles are sold by Goldhofer Fahrzeugwerk G.m.b.H. of Memmingen, Germany; Nicolas of Champs Sur Yonne, France; and, Talbert of Rensselaer, Ind.

Improved systems having automatic steering at all speeds and suspension systems that respond rapidly to the varying road conditions imposed by higher speeds would greatly reduce the time and effort required to move the vehicle to the load, move the load, and return the vehicle to storage.

SUMMARY OF THE INVENTION

The present invention is directed to a method and device for steering a heavy load transport vehicle. The invention combines a conventional hydraulic power steering valve with a variable length strut to effect steering control. The power steering valve is placed in "parallel" across the variable length strut so that as the variable length strut expands and contracts a small distance due to the movement of a tow bar, the power steer valve changes switching states, and though mechanical linkages, causes the transport vehicle to turn in the desired direction. In essence the variable length strut serves as a direction sensor which communicates the desired direction of turn to the power steering valve.

The present invention has a distinct advantage over prior art systems in the event of power steering system failure. The variable length strut will turn the steering system without hydraulic power. When this happens, the variable length strut absorbs the mechanical stresses of turning, thereby protecting the power steering valve. This is in contrast to prior art systems where the power steering valve is installed in series with the strut and is thereby exposed to large mechanical stresses if the power steering system fails.

Additionally, because of the small displacement of the variable length strut, the present invention provides rapid and continuous steering corrections as the transport vehicle is towed down a highway.

In accordance with a preferred embodiment of the invention, a device for steering a transport vehicle having a rotatable tow bar and a front dolly having front wheels is provided and includes:

a variable length strut connected between the tow bar and the front dolly, the variable length strut having a first section and a second section, the first and second sections longitudinally movable with respect to one another;

a hydraulic power steering valve having a first end and a second end;

the first end of the power steering valve connected to the first section of the variable length strut, and the second end of the power steering valve connected to the second section of the variable length strut; and, wherein when the tow bar is rotated, the first and second sections of the variable length strut longitudinally move with respect to one another causing the power steering valve to assume a hydraulic switching state, the switching state including one of (a) a left state which causes the front wheels of the front dolly to turn in a left direction, and (b) a right state which causes the front wheels of the front dolly to turn in a right direction.

In accordance with an aspect of the invention, when the rotation of the tow bar is stopped, the power steering valve assumes a neutral hydraulic switching state wherein further turning in a left direction or right direction ceases.

In accordance with an aspect of the invention, the first and second sections are longitudinally movable a distance of about 0.13 inches with respect to each other.

Other aspects of the present invention will become apparent from the following detailed description, taken in conjunction with the accompanying drawings, which illustrate, by way of example, the principles of the invention.

BRIEF DESCRIPTION OF THE DRAWINGS

FIG. 1 is a side elevation view of a prior art multi-axle transport vehicle for moving heavy loads;

FIG. 2 is a top plan view of the vehicle of FIG. 1;

FIG. 3 is a side elevation view of a second prior art transport vehicle;

FIG. 4 is a partial enlarged top plan view of the vehicle of FIG. 3;

FIG. 5 is a top plan view of a multi-axle transport vehicle which includes a system for steering the transport vehicle in accordance with the present invention;

FIG. 6 is an enlarged view of area 6 of FIG. 5;

FIG. 7 is an enlarged view of area 7 of FIG. 6;

FIG. 8 is a top plan view of the transport vehicle turning to the left;

FIG. 9 is an enlarged view of area 9 of FIG. 8;

FIG. 10 is an enlarged view of the device for steering the vehicle in accordance with the present invention;

FIG. 11 is an enlarged partial cross sectional view of area 11 of FIG. 10, showing the device in a neutral state;

FIG. 12 is an enlarged partial cross sectional view of area 11 of FIG. 10, showing the device in a turn left state;

FIG. 13 is an enlarged partial cross sectional view of area 11 of FIG. 10, showing the device in a turn right state;

DETAILED DESCRIPTION OF THE INVENTION

Figure 14:
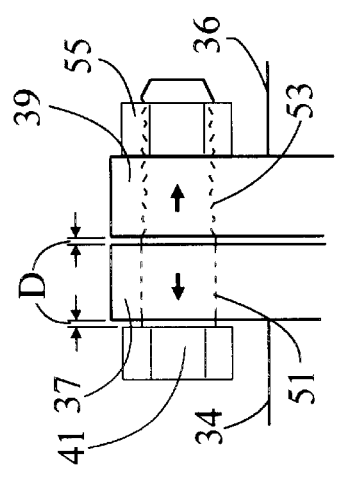
FIG. 14 is an enlarged view of area 14 of FIG. 11.

FIGS. 1 and 2 illustrate side elevation and top plan views, respectively, of a prior art multi-axle transport vehicle 500 for moving heavy loads. The vehicle 500 has a front dolly 502 and a pair of rear dollies 504 upon which a load 506 rests. A towing vehicle 508 such as a tractor pulls transport vehicle 500 using a tow bar 510.

FIGS. 3 and 4 are side elevation and partial enlarged top plan views respectively of a second prior art transport vehicle 600. Transport vehicle 600 includes a front hauling carriage 602 and a rear hauling carriage 604. Each hauling carriage has a plurality of dollies 606 (six in the shown embodiment). Each dolly 606 includes two rotatable axles 608 each having four wheels 610. Axles 608 are rotatably mounted to an axle beam 612. The dollies 606 are mechanically linked together by turning struts 615 which cause the axles 608 to rotate in a desired manner as transport vehicle 600 turns (refer also to FIG. 8). A load bed 614 is attached to two goosenecks 616 which rotatably connect to hubs 618 of hauling carriages 602 and 604. A heavy load 700 such as a large transformer is carried by load bed 614.

FIG. 5 illustrates a top plan view of a multi-axle transport vehicle 800 which includes a system 20 for steering the transport vehicle 800 in accordance with the present invention. As with FIG. 4, only the front hauling carriage is depicted. System 20 includes a rotatable tow bar 22 which is connected to a towing vehicle 802 and a front dolly 24. Front dolly 24 includes rotatable axle 25 having wheels 27. In the shown embodiment, there are both right and left front dollies 24. A hydraulic cylinder 26 (also refer to FIG. 6) is mechanically connected by a steering crank 28 and a steering strut 30 to front dolly 24. In the shown embodiment, there are two hydraulic cylinders 26 which are connected in push pull relationship. A variable length strut 32 is connected between tow bar 22 and front dolly 24. In the shown embodiment, variable length strut 32 is connected to left front dolly 24. However, it may be appreciated that it could alternatively be connected to right front dolly 24. Variable length strut 32 has a first section 34 and a second section 36 (refer to FIG. 10). First section 34 and second section 36 are longitudinally movable with respect to one another (refer to FIGS. 11–16). In an embodiment of the invention, first section 34 and second section 36 longitudinally move apart a total distance of about 0.13 inches as variable length strut 32 contracts and expands.

A hydraulic power steering valve 38 (also refer to FIG. 10) is coupled along strut 32. Hydraulic power steering valve 38 has a first end 40 and a second end 42. Hydraulic power steering valve 38 is of a type available from Garrison Manufacturing of Santa Ana, Calif. First end 40 of power steering valve 38 is connected to first section 34 of variable length strut 32, and second end 42 of power steering valve 38 is connected to second section 36 of variable length strut 32. That is, power steering valve 38 is attached in parallel across variable strut 32. Again referring to FIG. 10, power steering valve 38 is hydraulically connected by hydraulic lines to pair of front hydraulic cylinders 26 and to a hydraulic pump and a hydraulic fluid reservoir (also refer to FIG. 17).

Now also referring to FIGS. 9, 11, 12, and 13, when tow bar 22 is rotated, such as when towing vehicle 802 turns, first section 34 and second section 36 of variable length strut 32 longitudinally move with respect to one another causing power steering valve 38 to assume a hydraulic switching state. The hydraulic switching state is communicated to the pair of front hydraulic cylinders 26 which in turn, via steering crank 28 and steering strut 30, cause front axle 25 and wheels 27 of front dolly 24 to turn in one of (a) a left direction as shown, and (2) a right direction.

When the rotation of tow bar 22 is stopped, power steering valve 38 assumes a neutral hydraulic switching state wherein further turning in the left direction or the right direction ceases. That is, the axle 25 and wheels 27 of dolly 24 stop turning (rotationally moving). However, the axle 25 and wheels 27 remain in the turned configuration. FIGS. 17–20 discussed below provide a description of the flow of hydraulic fluid in system 20.

Again referring to FIG. 5, system 20 also has a rear dolly 44 (actually two rear dollies 44) which is mechanically linked to front dolly 24 via a series of linkage struts 46 as is well known in the art. A pair of rear hydraulic cylinders 48 are also arranged in push pull relationship, and are mechanically connected to rear dolly 44 via a rear steering crank 50 and rear steering strut 52. Power steering valve 38 is also hydraulically connected to the pair of rear hydraulic cylinders 48 (refer also to FIG. 20).

FIG. 6 is an enlarged view of area 6 of FIG. 5 showing various components of steering system 20.

FIG. 7 is an enlarged view of area 7 of FIG. 6 showing pair of hydraulic cylinders 26, steering crank 28, and steering struts 30. It is noted that steering crank 28 pivots about pivot point 31. Hydraulic cylinders 26 include pistons rods 23 which are driven back and forth by hydraulic pressure exerted upon a piston.

FIG. 8 is a top plan view of transport vehicle 800 turning to the left. Through the action of tow bar 22, variable length strut 32, power steering valve 38, hydraulic cylinders 26, steering crank 28, and steering struts 30, axle 25 and wheels 27 of dollies 24 have steered to the left. This steering motion has been coupled to other dolly 24 axles and wheels via linkage struts 46. Rear hydraulic cylinders 50 have been similarly activated by power steering valve 38 to assist in the turning action.

FIG. 9 is an enlarged view of area 9 of FIG. 8 showing various components of steering system 20 in a turned configuration.

FIG. 10 is an enlarged view of a device 100 for steering a transport vehicle 800 in accordance with the present invention. Referring also to FIG. 8, transport vehicle 800 has a rotatable tow bar 22 and a front dolly 24. Device 100 includes a variable length strut 32 which is connected between tow bar 22 and front dolly 24. Variable length strut 32 has a first elongated section 34 and a second elongated section 36, wherein first section 34 and second section 36 are longitudinally movable with respect to one another. That is, first section 34 and second section 36 may be longitudinally moved toward one another (contracted, refer to FIG. 12), or move away from one another (expanded, refer to FIG. 13). Device 100 further includes a hydraulic power steering valve 38 having first end 40 and second end 42. First end 40 of power steering valve 38 is connected to first section 34 of variable length strut 32, and second end 42 of power steering valve 38 is connected to second section 36 of variable length strut 32. Because of this connection, as sections 34 and 36 longitudinally move with respect to one another, their relative position is directly coupled to power steering valve 38. Power steering valve 38 is hydraulically connected to a pump, a reservoir, and hydraulic cylinders 26 (refer also to FIGS. 17 through 20).

Referring also to FIG. 9, when tow bar 22 is rotated with respect to transport vehicle 800, such as when towing vehicle 802 turns, first section 34 and second section 36 of variable length strut 32 longitudinally move with respect to one another. The relative longitudinal movement of first section 34 and second section 36 causes powering steering valve 38 to assume a hydraulic switching state. That state can be one of (a) a left state which causes the front wheels 27 of front dolly 24 to turn (move) in a left direct, (b) a right state which causes the front wheels 27 of front dolly 24 to turn in a right direction, and (c) a neutral state which causes turning motion to cease, but leaves wheels 27 pointing in their last ordered direction.

Figure 17:
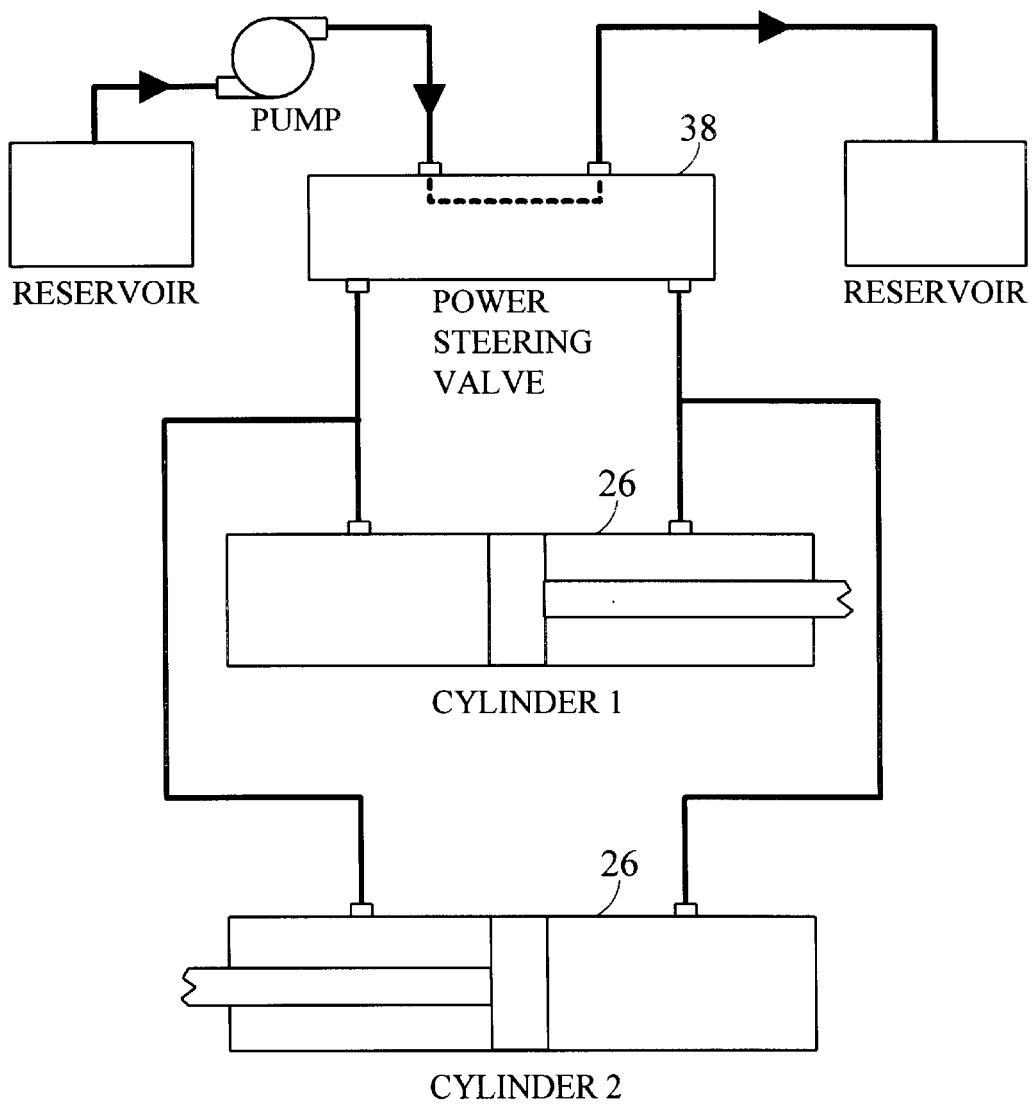
FIG. 17 is a hydraulic flow diagram with the device in a neutral hydraulic state.

FIG. 11 is an enlarged partial cross sectional view of area 11 of FIG. 10 showing device 100 in a neutral hydraulic switching state (also refer to FIG. 17). In this state the first section 34 and second section 36 of variable length strut 32 are neither moved together (contracted) nor moved apart (expanded). This relative longitudinal position of the two sections is mechanically coupled to power steering valve 38 which resultantly assumes a neutral hydraulic switching state. That is, front wheels 25 are neither ordered to turn to the left nor the right. It is noted that in an embodiment of the invention, first section 34 of variable length strut 32 is longitudinally received by second section 36, and the two sections are connected by a bolt and flange arrangement. Self-lubricating bearings 43 are installed between first section 34 and second section 36 of variable length strut 32.

Figure 18:
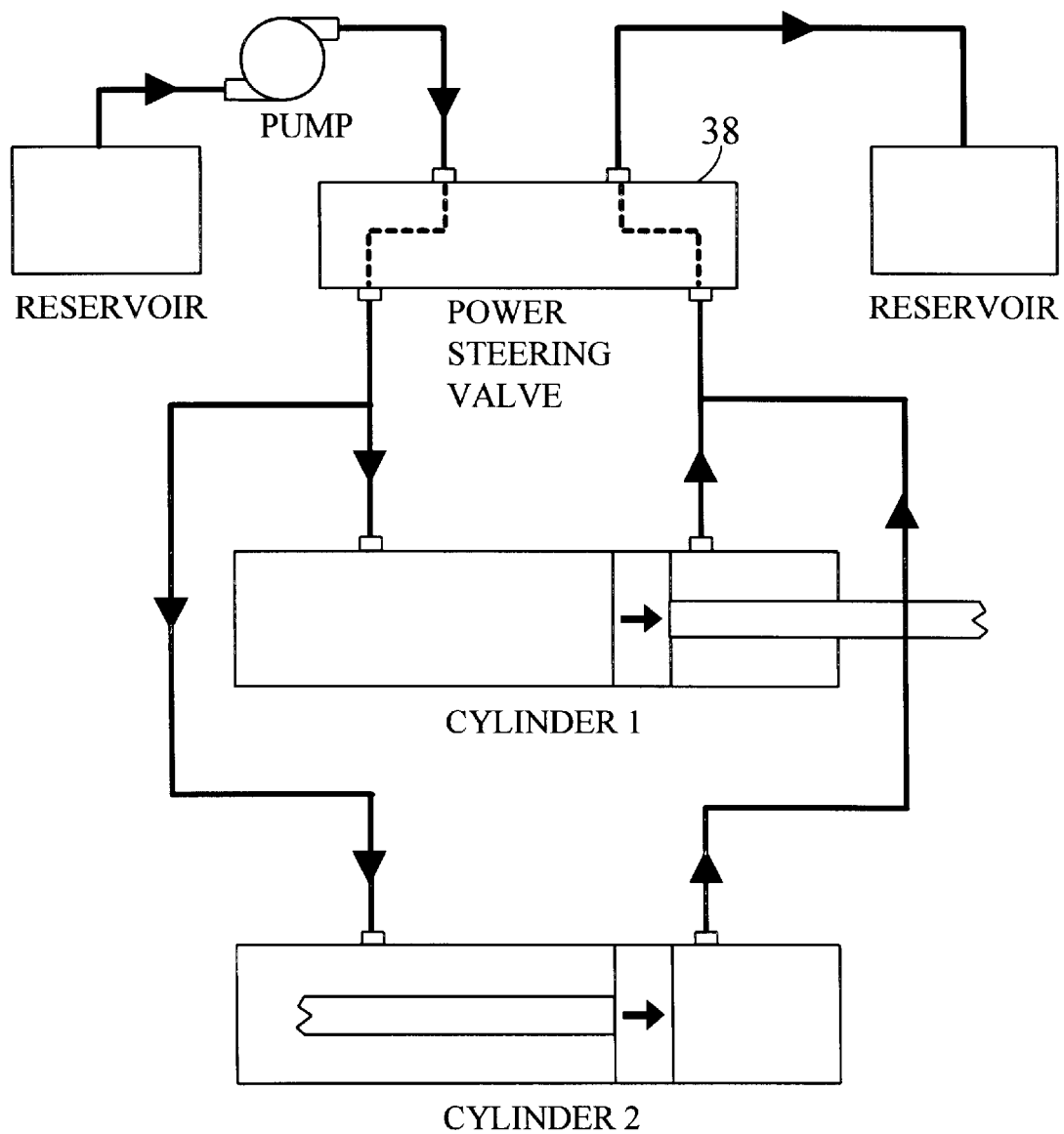
FIG. 18 is a hydraulic flow diagram with the device in a turn left hydraulic state.

FIG. 12 is an enlarged partial cross sectional view of area 11 of FIG. 10 showing device 100 in a turn left hydraulic switching state (also refer to FIG. 18). Referring also to FIG. 8, tow bar 22 has been rotated to the left as towing vehicle 802 turns left. This motion causes variable length strut 32 to contract. That is, first section 34 and second section 36 move together. This relative longitudinal position of the two sections is mechanically coupled to power steering valve 38 which, through an internal ball stud device, resultantly assumes a left hydraulic switching state which causes front wheels 27 of front dolly 24 to turn in a left direction.

Figure 19:
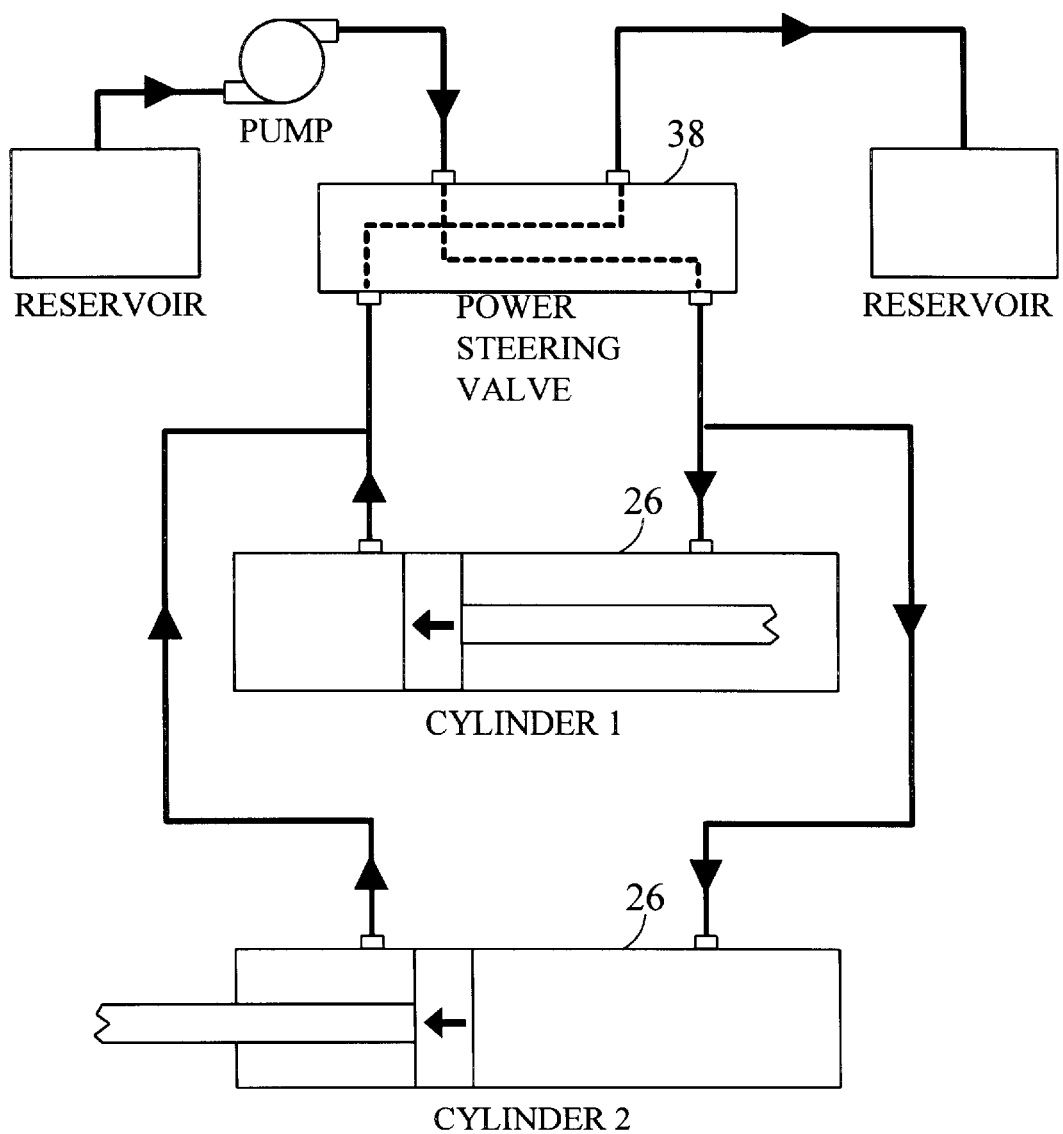
FIG. 19 is a hydraulic flow diagram with the device in a turn right hydraulic state; and, FIG. 20 is a hydraulic flow diagram of a second embodiment with the device in the neutral hydraulic state.

FIG. 13 is an enlarged partial cross sectional view of area 11 of FIG. 10 showing device 100 in a turn right hydraulic switching state (also refer to FIG. 19). Tow bar 22 is rotated to the right as towing vehicle 802 turns right. This motion causes variable length strut 32 to expand. That is, first section 34 and second section 36 move apart. This relative longitudinal position of the two sections is mechanically coupled to power steering valve 38 which resultantly assumes a right hydraulic switching state which causes front wheels 27 of front dolly 24 to turn in a right direction.

FIG. 14 is an enlarged view of area 14 of FIG. 11 showing the relative longitudinal position of first section 34 and second section 36 of variable length strut 32 which results in a neutral hydraulic switching state of power steering valve 38. Flange 37 of first section 34 and flange 39 of second section 36 are held together by a bolt 41 and reside in a spaced apart relationship wherein a distance D (about 0.065 inches) exists between the two flanges. This spaced relationship of first 34 and second 36 sections is mechanically coupled to power steering valve 38 (refer to FIG. 10), and causes power steering valve 38 to assume a neutral hydraulic switching state. Flange 37 has a through hole 51 and flange 39 has threads 53. Bolt 41 is fed through hole 51 and threaded into flange 39 until proper relative movement of flanges 37 and 39 has been achieved. Then a lock nut 55 is used to retain bolt 41 in a fixed position within threaded flange 39.

Figure 15:
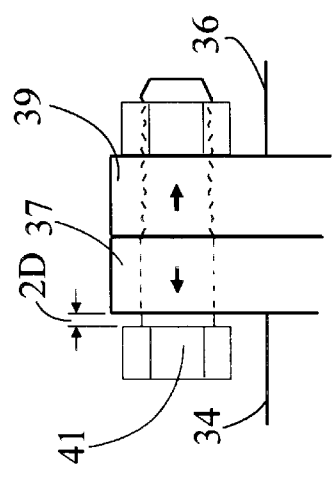
FIG. 15 is an enlarged view of area 15 of FIG. 12.

FIG. 15 is an enlarged view of area 15 of FIG. 12 showing the relative longitudinal position of first section 34 and second section 36 of variable length strut 32 which results in a turn left hydraulic switching state of power steering valve 38. As tow bar 22 is turned to the left, variable length strut 32 contracts thereby forcing first section 34 and second section 36 together so that flanges 37 and 39 come into contact. In an embodiment of the invention, the motion between first section 34 and second section 36 is small, being a total distance 2D of about 0.13 inches. That is, the difference between the contracted and expanded lengths of variable length strut 32 is 0.13 inches. The contracted relationship of first section 34 and second section 36 is mechanically coupled to power steering valve 38 (refer to FIG. 10), and causes power steering valve 38 to assume a left hydraulic switching state which causes front wheels 27 of front dolly 24 to turn in a left direction.

Figure 16:
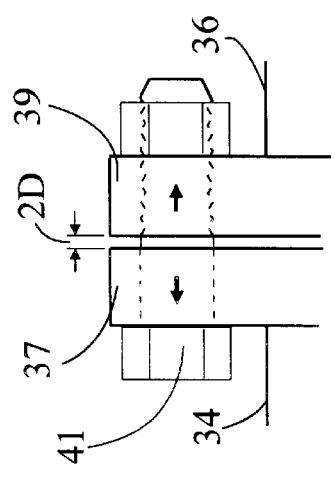
FIG. 16 is an enlarged view of area 16 of FIG. 13.

FIG. 16 is an enlarged view of area 16 of FIG. 13 showing the relative longitudinal position of first section 34 and second section 36 of variable length strut 32 which results in a turn right hydraulic switching state of power steering valve 38. As tow bar 22 is turned to the right, variable length strut 32 expands thereby forcing first section 34 and second section 36 apart. This expanded relationship of first section 34 and second section 36 is mechanically coupled to power steering valve 38 (refer to FIG. 10), and causes power steering valve 38 to assume a right hydraulic switching state which causes front wheels 27 of front dolly 24 to turn in a right direction.

FIG. 17 is a hydraulic flow diagram with device 100 in a neutral hydraulic state. Hydraulic fluid from a reservoir is pumped via hydraulic lines into power steering valve 38. In the neutral state, the fluid circulates through power steering valve 38 and is routed back to the reservoir. As has been previously discussed, the neutral hydraulic state of power steering valve 38 is controlled by the relative longitudinal motion of variable length strut 32.

FIG. 18 is a hydraulic flow diagram with device 100 in a turn left hydraulic state. Hydraulic fluid from a reservoir is pumped via hydraulic lines into one side of cylinders 26 and pushes upon a piston within cylinder 26. It may be appreciated that cylinders 26 are physically arranged so that the piston of one cylinder 26 moves in an opposite direction from the piston in the other cylinder 26. Fluid from the other side of cylinders 26 is routed back through power steering valve 38 to the reservoir. This turn left hydraulic configuration will be maintained as long as variable length strut 32 is being contracted by the turning action of tow bar 22.

FIG. 19 is a hydraulic flow diagram with device 100 in a turn right hydraulic state. Hydraulic fluid from a reservoir is pumped via hydraulic lines into one side of cylinders 26. It is noted that the fluid is delivered to the opposite side of cylinders 26 from the left hydraulic state of FIG. 18. Fluid from the other side of cylinders 26 is routed back through power steering valve 38 to the reservoir. This turn right hydraulic configuration will be maintained as long as variable length strut 32 is being expanded by the turning action of tow bar 22.

Figure 20:
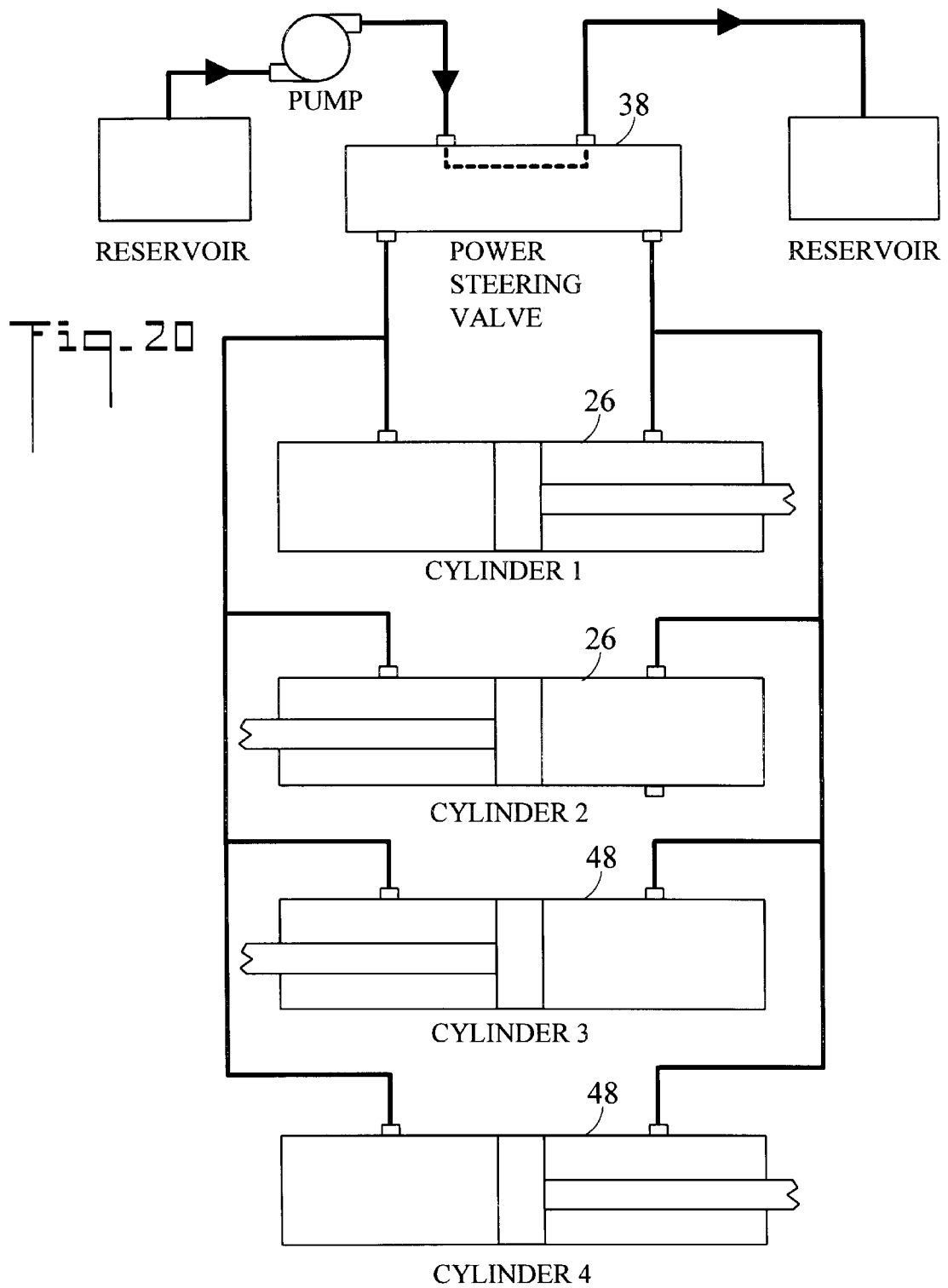

FIG. 20 is a hydraulic flow diagram of a second embodiment with device 100 in the neutral hydraulic state. The only difference in this configuration is that hydraulic fluid is also delivered to a second pair of rear cylinders 48 (refer to FIGS. 5 and 8).

It may be appreciated that the terms left and right can vary depending upon the specific arrangement of the mechanical elements of the present invention.

In terms of use, a method for steering a transport vehicle 800, includes:
(a) providing a transport vehicle 800 having a rotatable tow bar 22 and a front dolly 24 having front wheels 25;
(b) providing a device 100 for steering the transport vehicle 800, device 100 including:
a variable length strut 32 connected between tow bar 22 and front dolly 24, the variable length strut 32 having a first section 34 and a second section 36, the first section 34 and second section 36 longitudinally movable with respect to one another;
a hydraulic power steering valve 38 having a first end 40 and a second end 42;
first end 40 of power steering valve 38 connected to first section 34 of variable length strut 32, and second end 42 of power steering valve 38 connected to second section 36 of variable length strut 32; and,
(c) rotating tow bar 22 thereby causing first section 34 and second section 36 of variable length strut 32 to longitudinally move with respect to one another, the motion causing power steering valve 38 to assume a hydraulic switching state, the hydraulic switching state including one of (a) a left state which causes front wheels 27 of front dolly 24 to turn in a left direction, and (b) a right state which causes front wheels 27 of front dolly 24 to turn in a right direction.

The method may further include:
(d) ceasing to rotate tow bar 22 wherein power steering valve 38 assumes a neutral hydraulic switching state and further turning in the left direction or right direction ceases.

The method may further include:
in step (b), the first section 34 and second section 36 longitudinally movable a distance of about 0.13 inches.

The preferred embodiments of the invention described herein are exemplary and numerous modifications, variations, and rearrangements can be readily envisioned to achieve an equivalent result, all of which are intended to be embraced within the scope of the appended claims.

I claim:

1. A method for steering a transport vehicle, comprising:
(a) providing a transport vehicle having a rotatable tow bar and a front dolly having front wheels;
(b) providing a device for steering said transport vehicle, including:
a variable length strut connected between said tow bar and said front dolly, said variable length strut having a first section and a second section, said first section and said second section longitudinally movable with respect to one another;
a hydraulic power steering valve having a first end and a second end; and,
said first end of said power steering valve connected to said first section of said variable length strut, and said second end of said power steering valve connected to said second section of said variable length strut; and,
(c) rotating said tow bar thereby causing said first section and said second section of said variable length strut to longitudinally move with respect to one another, said motion causing said power steering valve to assume a hydraulic switching state, said hydraulic switching state including one of (a) a left state which causes said front wheels of said front dolly to turn in a left direction, and (b) a right state which causes said front wheels of said front dolly to turn in a right direction.

2. The method of claim 1, further including:
(d) ceasing to rotate said tow bar, wherein said power steering valve assumes a neutral hydraulic switching state wherein further turning in said left direction or said right direction ceases.

3. The method of claim 1, further including:
in step (b), said first section and said second section longitudinally movable a distance of about 0.13 inches.

4. A device for steering a transport vehicle, the transport vehicle having a rotatable tow bar and a front dolly having front wheels, said device comprising:
a variable length strut connected between the tow bar and the front dolly, said variable length strut having a first section and a second section, said first section and said second section longitudinally movable with respect to one another;
a hydraulic power steering valve having a first end and a second end;
said first end of said power steering valve connected to said first section of said variable length strut, and said second end of said power steering valve connected to said second section of said variable length strut; and,
wherein when the tow bar is rotated said first section and said second section of said variable length strut longitudinally move with respect to one another, said motion causing said power steering valve to assume a hydraulic switching state, said switching state including one of (a) a left state which causes the front wheels of the front dolly to turn in a left direction, and (b) a right state which causes the front wheels of the front dolly to turn in a right direction.

5. A device according to claim 4, further including:
wherein when said rotation of the tow bar is stopped, said power steering valve assuming a neutral hydraulic switching state wherein further turning in said left direction or said right direction ceases.

6. A device according to claim 4, further including:
said first section and said second section longitudinally movable a distance of about 0.13 inches.

7. A system for steering a transport vehicle, comprising:
a rotatable tow bar;
a front dolly having front wheels;

a front hydraulic cylinder mechanically connected to said front dolly;

a variable length strut connected between said tow bar and said front dolly, said variable length strut having a first section and a second section, said first section and said second sections longitudinally movable with respect to one another;

a hydraulic power steering valve having a first end and a second end, said first end of said power steering valve connected to said first section of said variable length strut, and said second end of said power steering valve connected to said second section of said variable length strut, said power steering valve hydraulically connected to said front hydraulic cylinder; and, wherein when said tow bar is rotated said first section and said second section of said variable length strut longitudinally move with respect to one another, said motion causing said power steering valve to assume a hydraulic switching state, said hydraulic switching state communicated to said front hydraulic cylinder which in turn causes said front wheels of said front dolly to turn in one of (a) a left direction, and (2) a right direction.

8. A system according to claim 7, further including:

wherein when said rotation of said tow bar is stopped, said power steering valve assuming a neutral hydraulic switching state wherein further turning in said left direction or said right direction ceases.

9. A system according to claim 7, further including:

said first section and said second section longitudinally movable a distance of about 0.13 inches.

10. A system according to claim 7, further including:

said front hydraulic cylinder including a pair of said cylinders arranged in a push pull relationship.

11. A system according to claim 7, further including:

a rear dolly mechanically linked to said front dolly;

a pair of rear hydraulic cylinders arranged in a push pull relationship, said pair of rear hydraulic cylinders mechanically connected to said rear dolly; and, said power steering valve hydraulically connected to said pair of rear hydraulic cylinders.

* * * * *